United States Patent
Choi

(10) Patent No.: US 7,273,502 B2
(45) Date of Patent: Sep. 25, 2007

(54) METHOD FOR MANUFACTURING CAPACITOR

(75) Inventor: Kee Joon Choi, Seoul (KR)

(73) Assignee: Dongbu Electronics Co., Ltd., Seoul (KR)

( * ) Notice: Subject to any disclaimer, the term of this patent is extended or adjusted under 35 U.S.C. 154(b) by 21 days.

(21) Appl. No.: 11/317,986

(22) Filed: Dec. 22, 2005

(65) Prior Publication Data

US 2006/0133009 A1    Jun. 22, 2006

(30) Foreign Application Priority Data

Dec. 22, 2004    (KR) .................. 10-2004-0110616

(51) Int. Cl.
*H01G 9/00*    (2006.01)

(52) U.S. Cl. .................. 29/25.03; 29/25.41; 29/25.42; 361/303; 361/306.3

(58) Field of Classification Search .... 29/25.35–25.42, 29/854, 825, 846; 361/303, 313, 306.3; 438/212, 438/268

See application file for complete search history.

(56) References Cited

U.S. PATENT DOCUMENTS

| | | | | |
|---|---|---|---|---|
| 3,872,360 A | * | 3/1975 | Sheard | 361/305 |
| 4,604,676 A | * | 8/1986 | Senda et al. | 361/309 |
| 4,819,128 A | * | 4/1989 | Florian et al. | 361/321.3 |
| 4,910,638 A | * | 3/1990 | Berghout et al. | 361/321.3 |
| 5,735,027 A | * | 4/1998 | Hageman et al. | 29/25.35 |
| 5,757,610 A | * | 5/1998 | Wada et al. | 361/311 |
| 6,687,114 B1 | * | 2/2004 | Kamath et al. | 361/306.3 |

* cited by examiner

*Primary Examiner*—Minh Trinh
(74) *Attorney, Agent, or Firm*—Andrew D. Fortney

(57) ABSTRACT

A capacitor and a method for manufacturing the same provide a branched capacitor with a large capacitance and a super-slim structure. The method includes sintering a ceramic substrate; forming a plurality of troughs in the sintered ceramic substrate, the plurality of troughs including first and second sets of troughs corresponding to opposing electrodes; and filling the troughs with metal to form a plurality of metal lines arranged alternately in the plurality of troughs.

18 Claims, 4 Drawing Sheets

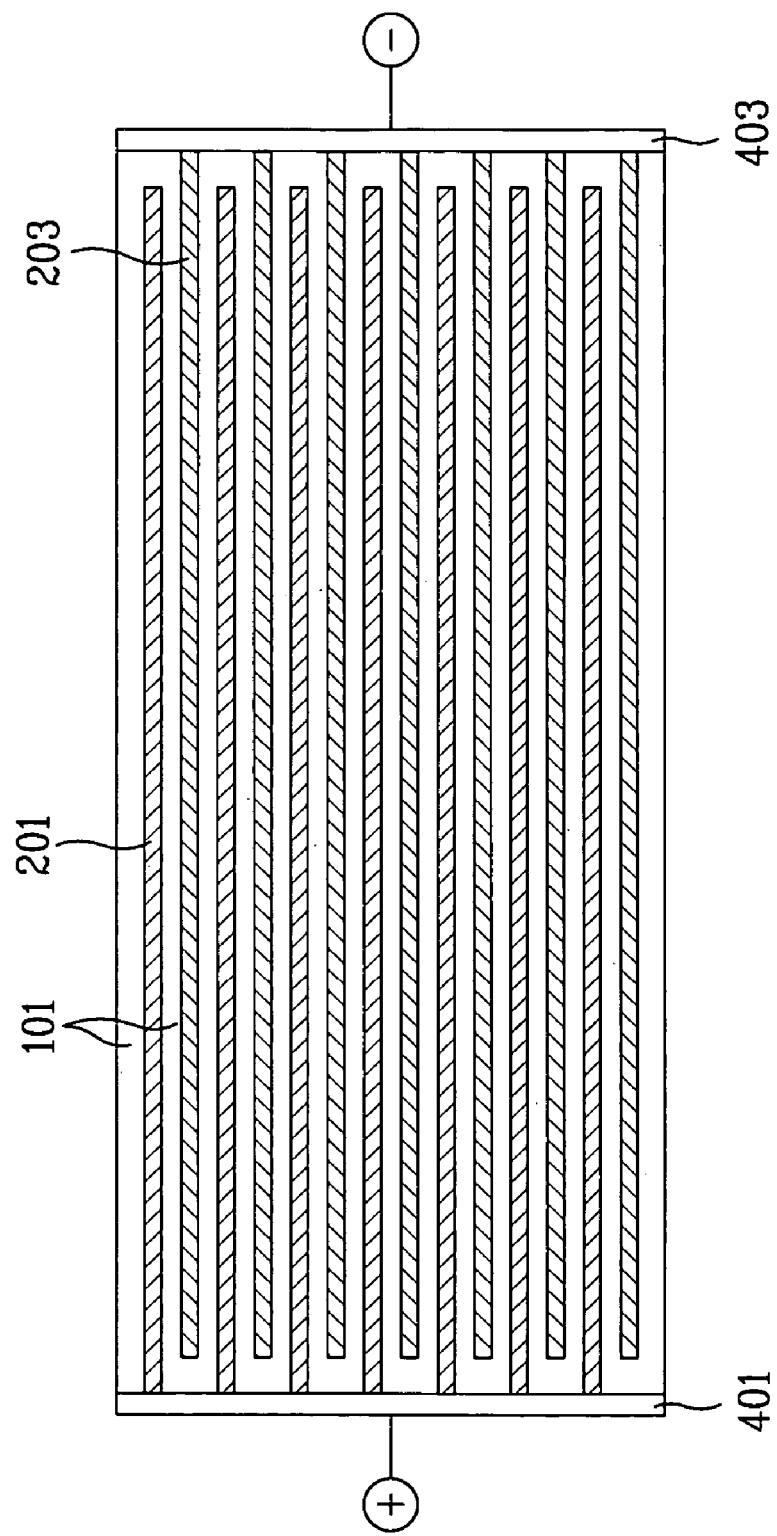

METHOD FOR MANUFACTURING CAPACITOR

This application claims the benefit of Korean Patent Application No. 10-2004-0110616, filed on Dec. 22, 2004, which is hereby incorporated by reference as if fully set forth herein.

BACKGROUND OF THE INVENTION

1. Field of the Invention

The present invention relates to a capacitor, and more particularly, to a capacitor and a method for manufacturing the same. In one embodiment, the invention provides a branched or multi-fingered capacitor with a large capacitance and a super-slim structure.

2. Discussion of the Related Art

Personal digital assistants, notebook computers, cellular telephones, and other lightweight or portable electronic devices use a rechargeable battery such as a lithium-ion chemical battery, which may be substituted with a high-capacity capacitor as a power source to avoid the dangers inherent to batteries that use chemical electrolysis. The overall packaging of such portable devices should be as thin as possible, limiting the space for the power pack, and capacitors for such devices and/or power packs should have the thinnest possible structure. The industry has termed such structures as "super-slim" structures.

Meanwhile, the capacitance of a capacitor may be increased by increasing the effective surface area of the electrodes, for example, through the use of a multi-layer structure including an opposing pair of electrodes, each comprising an electrically connected set of interlocking fins having a dielectric layer interposed therebetween. By increasing the number of fins, each of which constitutes a layer of electrode material, the resulting capacitance can be increased accordingly. Multi-layer capacitors, however, necessitate a greater thickness of a capacitor's overall size, which runs counter to the aim of the super-slim structure of a capacitor for application in narrow spaces.

In using a capacitor as described above in a portable electronic device, a high capacitance enables longer operation between charging cycles. Thus, a need is felt for capacitors having higher capacitance, while still providing the above-described super-slim structure. Furthermore, a desirable capacitor also should enable a high-voltage operation of the portable electronic device.

SUMMARY OF THE INVENTION

Accordingly, the present invention is directed to a capacitor and a method for manufacturing the same that substantially meets a need in the art and/or obviates one or more problems due to limitations and/or disadvantages of the related art.

An object of the present invention is to provide a capacitor and a method for manufacturing the same, which provides a branched or multi-fingered capacitor with a large capacitance for use as a power source of a portable electronic device, by applying semiconductor processing technology.

Another object of the present invention is to provide a capacitor and a method for manufacturing the same, which provides a branched or multi-finger capacitor with a super-slim structure for use as a power source of a portable electronic device, by applying semiconductor processing technology.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure(s) and/or method(s) particularly pointed out in the written description and claims hereof as well as the appended drawings.

To achieve these objects and other advantages in accordance with the purpose of the invention, as embodied and broadly described herein, there is provided a method for manufacturing a capacitor, the method comprising forming a plurality of trough patterns in the sintered ceramic substrate, the plurality of trough patterns including first and second sets of trough patterns corresponding to opposing electrodes; and filling the trough patterns with metal to form a plurality of metal lines arranged alternately with respect to the plurality of trough patterns.

In another aspect of the present invention, there is provided a capacitor comprising a ceramic substrate having a plurality of trough patterns; a plurality of metal lines in the trough patterns, having ends alternately offset at opposite ends of the ceramic substrate; a first electrode terminal at one of the opposite ends and electrically connected to a first set of alternately offset metal lines; and a second electrode terminal at the other of the opposite ends and electrically connected to a second set of alternately offset metal lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings:

FIG. 7 is a schematic diagram of a branched capacitor according to the present invention.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

The method of the present invention applies semiconductor manufacturing technology, such as photolithography and selective etching, to manufacture a branched capacitor. A good material for the dielectric of such a capacitor is ceramic, which exhibits a high dielectric value. The phase transformation of ceramic dielectrics, however, generally benefits from high-temperature sintering at, for example, 1000° C. or greater, which is above than the melting point of a metal (e.g., aluminum) commonly used for capacitor electrodes in semiconductor manufacturing technology. Therefore, according to one embodiment of the present invention, calcination and/or sintering are performed on a ceramic wafer or substrate (preferably prior to deposition of a relatively low-melting metal such as aluminum).

Figure 1:
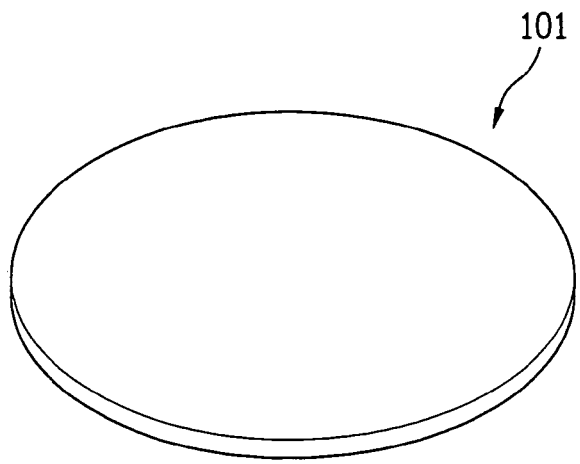
FIG. 1 is a perspective view of a ceramic wafer used in a method for manufacturing a branched capacitor according to the present invention.
Figure 2:
FIG. 2 is a schematic circuit diagram of a branched capacitor according to the present invention.
Figure 3:
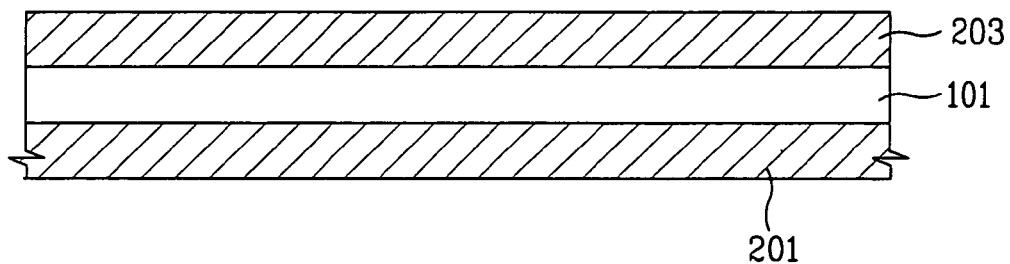
FIG. 3 is a cross-sectional view of a unit capacitor according to the present invention.

That is, as shown in FIG. 1, a ceramic material is formed as a wafer, which may undergo calcination and/or sintering (for example, at a temperature of 1000° C. or greater, in a conventional furnace for sintering ceramic objects such as disks) to form a ceramic substrate 100, which is then subject to photolithography and selective etching. A capacitor structure having a ceramic dielectric (such as ceramic substrate 100 or a portion thereof other than a trough) interposed between adjacent layers or lines of a metal material formed as opposing electrodes is shown schematically in FIG. 2. Each layer or line, including the ceramic dielectric 101, is thinly formed and arranged in a generally parallel configuration, as shown in FIG. 3. This configuration, when manufactured at least in part by a technology for manufacturing semiconductor devices, enables a super slim structure and a high capacitance.

Referring to FIG. 3, the basic structure of a unit capacitor includes a ceramic portion 101 serving as a capacitor dielectric, comprising or consisting essentially of a material such as a titanate ceramic (e.g., barium titanate ($BaTiO_3$) or lead zirconium titanate (PZT)) between the capacitor electrodes, having a high dielectric constant and enabling high operation voltages; a first electrode 201 on one side of the ceramic portion, for example, below or on one side of the ceramic portion; and a second electrode 203 on the other side of the ceramic portion, for example, above or on an opposite side of the ceramic layer. The first electrode 201, the ceramic portion 101, and the second electrode 203 are formed directly on one another. Alternatively, the first and second electrodes 201 and 203 may be formed directly on a ceramic substrate including the ceramic portion 101. Each of the first and second electrode layers 201 and 203 comprise or consist essentially of a conductive metal, such as copper, which in the final structure will be electrically connected to one of a pair of opposing electrode terminals (see FIG. 7), for example by arranging the unit capacitors as a set of interlocking fins.

Figure 4:
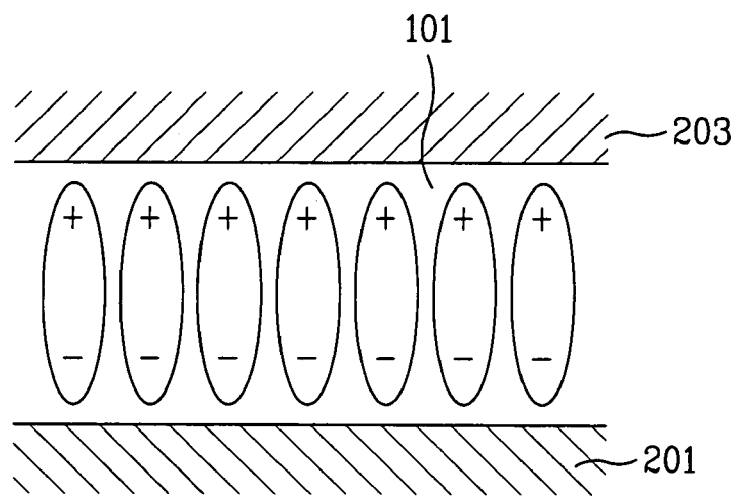
FIG. 4 is a cross-sectional view of the capacitor unit of FIG. 3, illustrating the basic operation of a branched capacitor according to the present invention.

Referring to FIG. 4, in the operation of each unit capacitor, a high capacitance is generated in the ceramic layer 101, which has electric polarization characteristics. Capacitance (C) can be calculated using the dielectric constant (k) of the ceramic material of the ceramic layer 101, the effective surface area (A) of the opposing electrodes, and an interval or distance (d) between electrode surfaces, generally according to the equation(s) $C=kA(1/d)$ or $C=kA/d$. Capacitance can be further increased in a configuration whereby a large number of fingers or branches are arranged in parallel (e.g., in an "interlocking comb-like" arrangement), alternating between electrode and dielectric material to effectively increase the surface area of the capacitor electrodes. In doing so, the above-obtained capacitance is multiplied by approximately the number of unit capacitors forming the fingers or branches.

At the same time, semiconductor manufacturing technology enables a decrease in the interval between adjacent electrode surfaces, with the intervals comprising a high-k ceramic material, thereby further increasing capacitance while enabling a super-slim capacitor structure. That is, the basic structure of FIG. 3 is repeated to form a branched capacitor, whereby a plurality of the first electrode branches 201 are electrically connected with one another and a corresponding plurality of the second electrode branches 203 are electrically connected with one another, with adjacent electrode branches (i.e., one from each of the first and second electrodes) being electrically insulated from each other by one of a plurality of the ceramic portions 101. Each set of electrode branches is connected in parallel to obtain one high-capacitance capacitor.

The substrate used in manufacturing the above-described branched capacitor may be a ceramic wafer for forming the dielectric layer, although a silicon dioxide ($SiO_2$) substrate may also be used. Also, the substrate may have any shape that can be processed using semiconductor (or circuit board) manufacturing techniques, such as square, rectangular, circular, etc. After sintering the wafer at a temperature of 1000° C. or greater to impart a high dielectric constant, the ceramic substrate 100 is patterned using known semiconductor processing techniques, including, for example, line-type trough patterns according to design rule (feature size) limitations, namely, the desired interval between electrode branches. Due to the brittle nature of ceramic, the desired interval may be a scribe line width as conventionally used in commercial semiconductor manufacturing.

Figure 5:
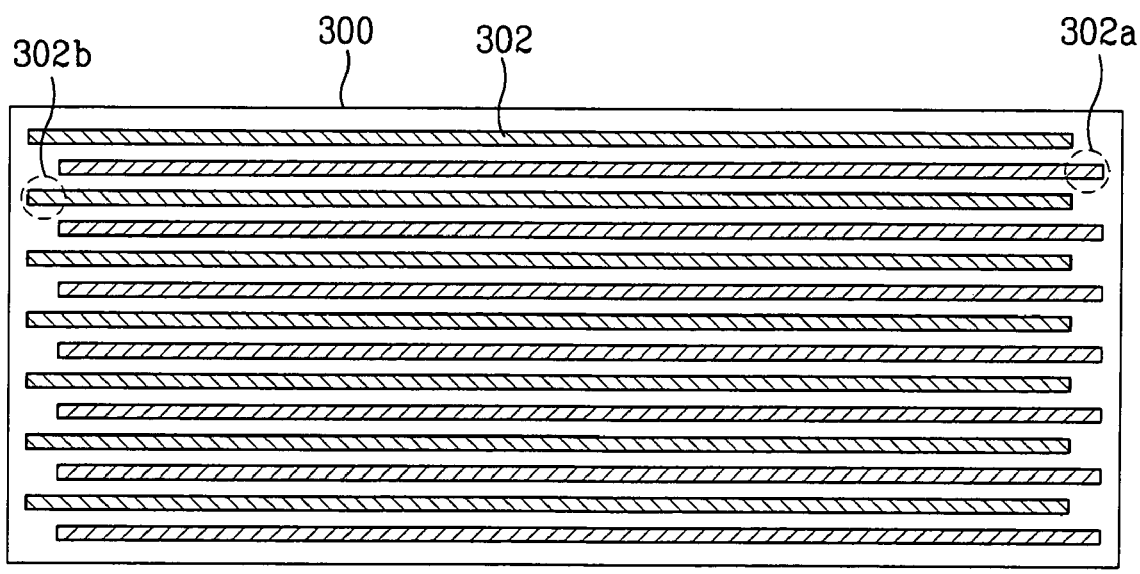
FIG. 5 is a plan view of a layout of a branched capacitor according to the present invention.
Figure 6:
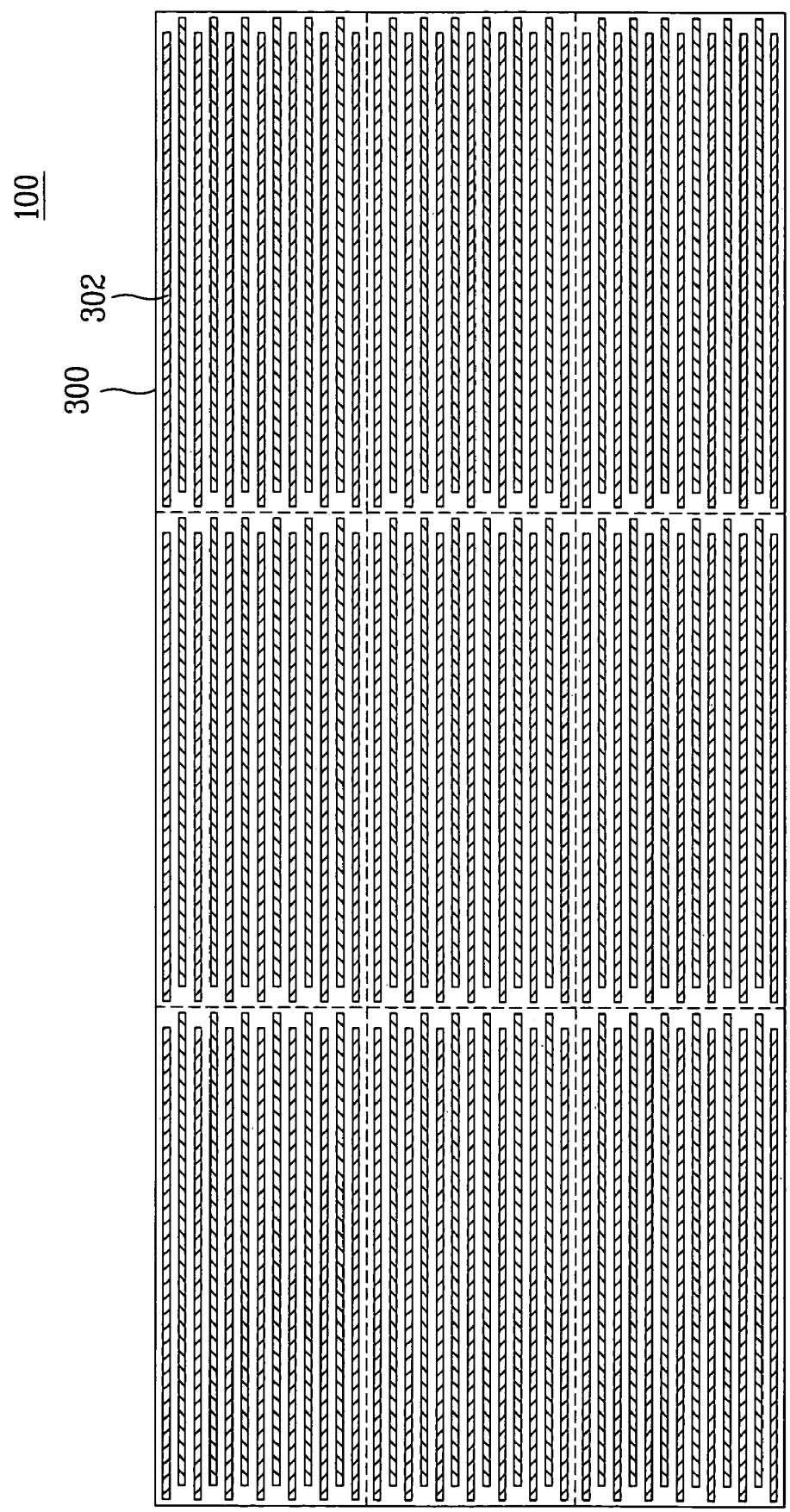
FIG. 6 is a plan view of a repeated arrangement of the layout of FIG. 5.

The patterning of the ceramic substrate 100 may comprise a layout, an example of which is shown in FIG. 5, which may be repeatedly formed across the wafer as shown in FIG. 6. Here, a layout 300 of trough patterns 302 is transferred onto the ceramic substrate 100 by a photolithographic process followed by a selective etching process. The etching of the ceramic substrate 100 forms a plurality of grooves corresponding to the trough patterns 302. Following deposition of the metal or other conductor into the troughs and subsequent processing to remove any metal or conductor over the ceramic portions 101, and the rear surface of the ceramic substrate 100 may be back grinded to reduce the thickness of the capacitor and/or so that the metal-filled troughs or grooves may penetrate the substrate. The trough patterns 302 thus form the electrode layers of the capacitor and include an extension 302a or 302b at either side of the layout in an alternating arrangement corresponding to each of the opposing pair of electrodes of the completed capacitor, such that the extensions of any two adjacent trough patterns occur at opposite ends.

A metal thin film, such as a copper thin film, is formed on the ceramic substrate 100 in which the troughs 302 have been formed by depositing a thin film of the metal and heating the deposited metal to a temperature above its melting point. The heated substrate may then be pressurized in an inert (e.g., nitrogen $N_2$) gas ambient, to thereby draw the metal (copper) into the trough patterns 302 (i.e., the gaps in the ceramic surface of the substrate), by capillary action (which may be due to the pressurization and/or surface tension of the heated metal). At this time, the ceramic substrate 100 is supported by a chuck (e.g., to enable draining the interface with the substrate and/or depressurizing the interface).

Accordingly, a structure can be obtained in which branched copper electrodes with an interposed ceramic are formed on the patterned ceramic substrate 100. The thus-processed ceramic substrate may be separated by sawing to form the shot of each capacitor cell, i.e., an individual capacitor body without electrode terminals. Opposite sides of each shot, corresponding to the electrode terminals of the capacitor, may be ground to expose one set of the alternately arranged pattern extensions (e.g., 302a and/or 302b). The ground surface of each side is coated with a layer of conductive material such silver or gold, to form a first electrode terminal 401 in electrical contact with each of the plurality of first electrode branches 201 and a second electrode terminal 403 in electrical contact with each of the plurality of second electrode branches 203, as shown in FIG. 7, where positive (+) and negative (−) electrodes may be respectively connected to the electrode terminals.

The capacitor thus has a branched or comb-like capacitor structure in which the first electrode branches 201, the second electrode branches 203, and the ceramic substrate 100 serving as the dielectric between the first and second electrodes 203 are patterned in an alternating sequence (e.g., first electrode branch, ceramic, second electrode branch, ceramic, first electrode branch, ceramic, second electrode branch, ceramic, etc.). Since a plurality of unit capacitors are formed in parallel, the whole capacitor can be imparted with a high capacitance and a super-slim structure.

According to the present invention, a branched capacitor can be obtained by sintering a ceramic substrate, etching the substrate to form the trough patterns, and filling the trough patterns with metal. The trough patterns can be formed by semiconductor processing techniques with only a partial modification of existing equipment, so that the capacitor can be manufactured at a low cost by a simple process. The branched capacitor of the present invention is thus particularly applicable for lightweight and portable electronic devices, perhaps including a display device yet to be developed.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A method for manufacturing a capacitor, comprising:
    forming a plurality of troughs in a ceramic substrate, the plurality of troughs including first and second sets of troughs corresponding to opposing electrodes;
    filling the troughs with metal to form a plurality of metal lines in the plurality of troughs; and
    exposing opposite ends of the metal lines by sawing the ceramic substrate and grinding corresponding opposite ends of the ceramic substrate.

2. The method as claimed in claim 1, further comprising:
    forming first and second electrode terminals respectively connected electrically to opposite ends of the metal lines, the metal lines in the first set of troughs being connected to first electrode terminal and the metal lines in the second set of troughs being connected to the second electrode terminal.

3. The method as claimed in claim 2, wherein the first set of troughs include an extension at one end, the second set of troughs include an extension at an opposite end, and the first and second sets of troughs are in an alternating arrangement.

4. The method as claimed in claim 3, wherein said exposing exposes the extension of one set of the troughs and does not expose another set of the troughs.

5. The method as claimed in claim 3, wherein the extensions of any two adjacent troughs occur at opposite ends.

6. The method as claimed in claim 1, wherein exposing the opposite ends of the metal lines comprises sawing the ceramic substrate and grinding corresponding opposite ends of the ceramic substrate.

7. The method as claimed in claim 6, further comprising:
    forming first and second electrode terminals on the exposed opposite ends of the metal lines, respectively.

8. The method as claimed in claim 7, wherein the first and second electrode terminals each include at least one of silver and gold.

9. The method as claimed in claim 1, wherein the ceramic substrate comprises a ceramic material including at least one of barium titanate and lead zirconium titanate.

10. The method as claimed in claim 1, wherein the ceramic substrate comprises a ceramic material including silicon dioxide.

11. The method as claimed in claim 1, further comprising:
    sintering the ceramic substrate, prior to forming the plurality of trough patterns therein.

12. The method as claimed in claim 11, wherein said sintering is performed at a temperature above 1000° C.

13. The method as claimed in claim 1, wherein forming said plurality of troughs comprises:
    preparing a layout for a trough pattern;
    transferring the layout onto the ceramic substrate by performing a photolithographic process; and
    forming grooves corresponding to the transferred trough pattern in the ceramic substrate by selective etching.

14. The method as claimed in claim 1, further comprising, after filling the troughs with metal, back grinding the ceramic substrate.

15. The method as claimed in claim 13, further comprising:
    sawing the ceramic substrate into shots corresponding to areas of the trough pattern.

16. The method as claimed in claim 1, said filling comprising:
    depositing a metal thin film on the ceramic substrate; and
    heating the deposited metal thin film to a temperature above the melting point of the metal.

17. The method as claimed in claim 16, further comprising:
    pressurizing the heated metal thin film under a nitrogen ambient to fill the troughs.

18. The method as claimed in claim 17, further comprising:
    draining the ceramic substrate from a bottom side, the bottom side being opposite the deposited metal thin film.

* * * * *